Figure 3:
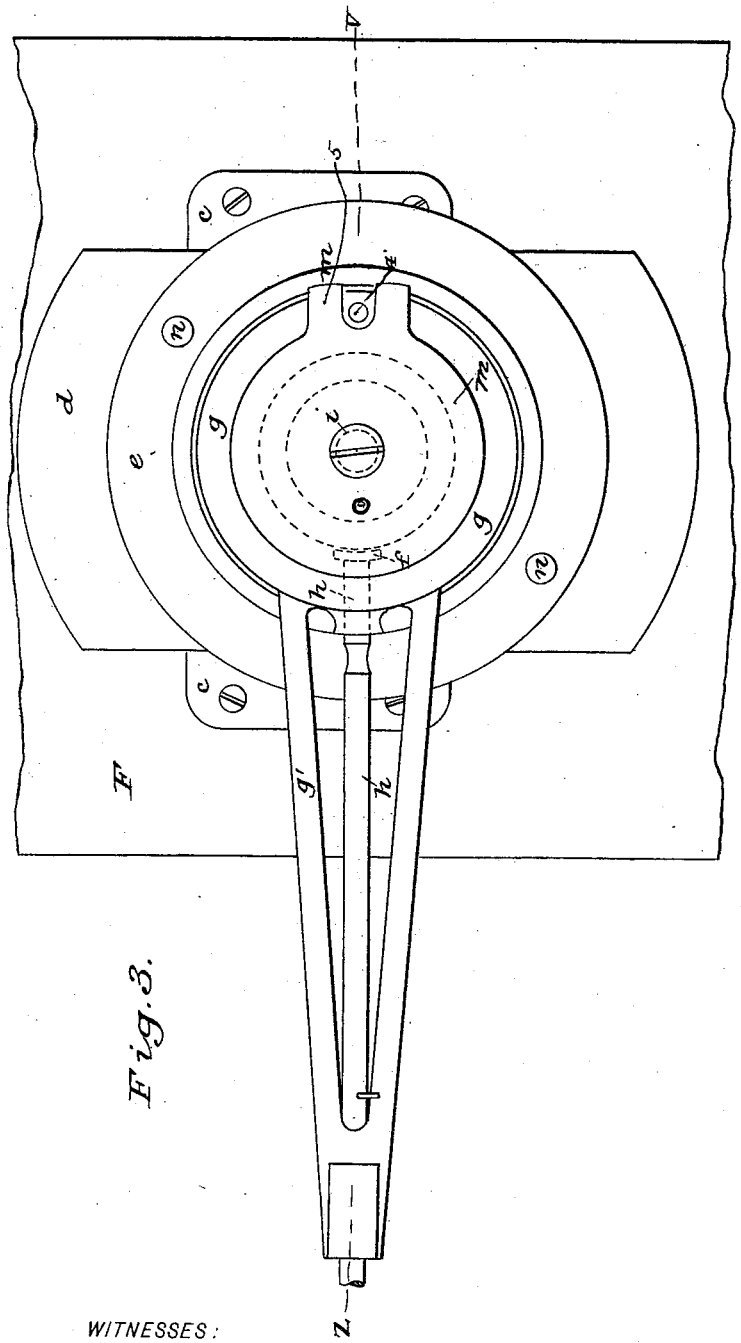

(No Model.) 14 Sheets—Sheet 1.
A. TESSARO.
APPARATUS FOR WRITING MUSIC.
No. 484,262. Patented Oct. 11, 1892.
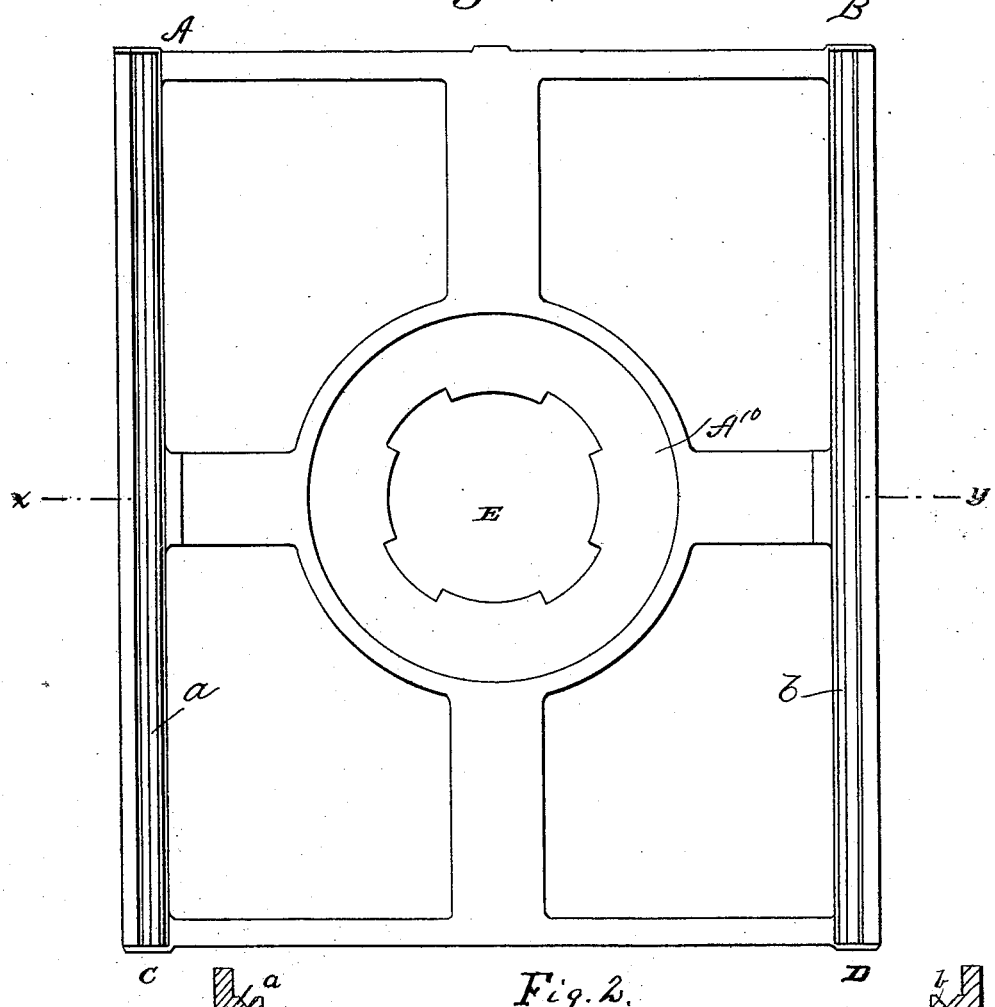
WITNESSES: INVENTOR (No Model.) 14 Sheets—Sheet 2.

A. TESSARO.
APPARATUS FOR WRITING MUSIC.

No. 484,262. Patented Oct. 11, 1892.

WITNESSES:
E. B. Bolton
A. S. Bussing

INVENTOR
Angelo Tessaro
BY
Richards
ATTORNEYS

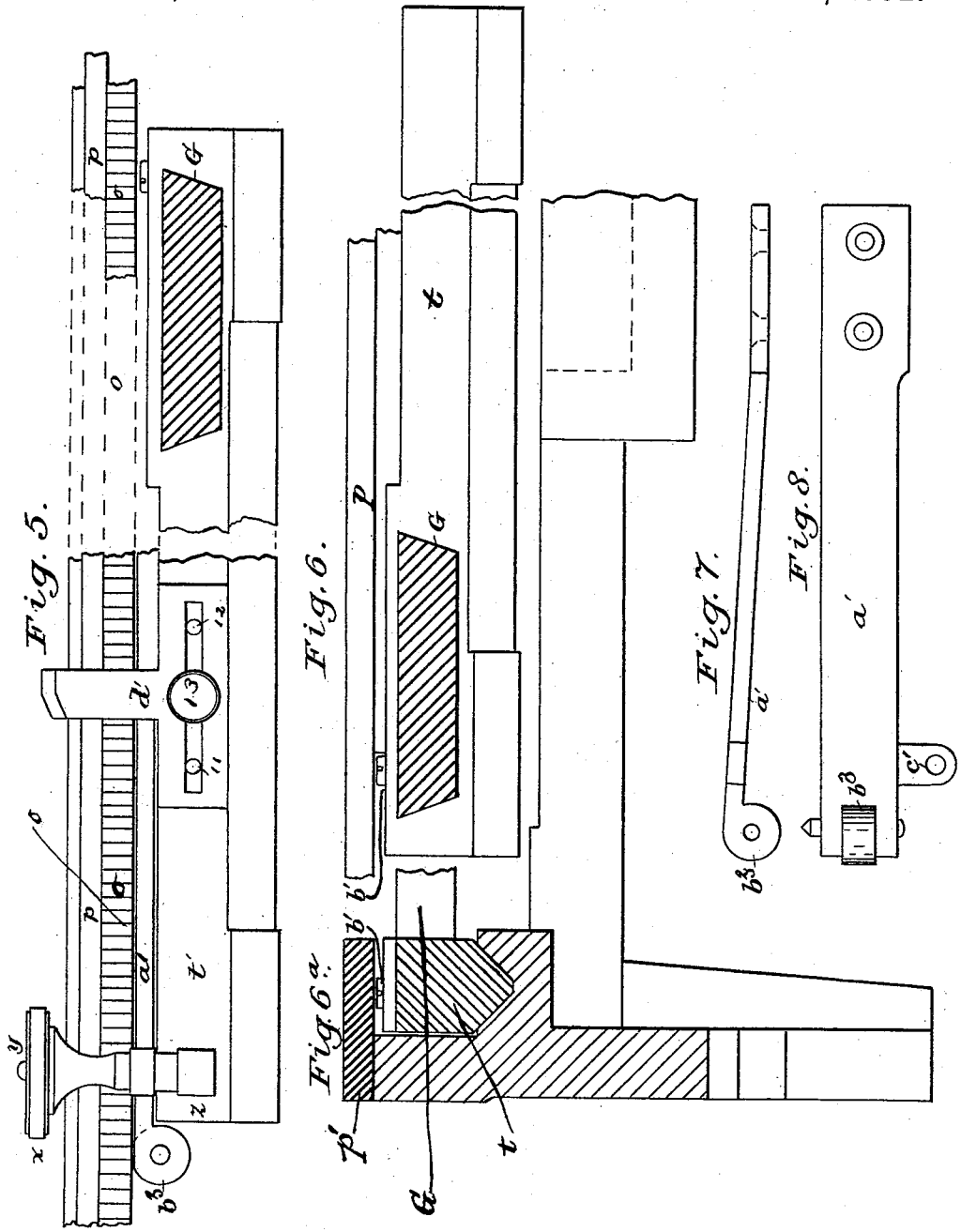

(No Model.) 14 Sheets—Sheet 4.

A. TESSARO.
APPARATUS FOR WRITING MUSIC.

No. 484,262. Patented Oct. 11, 1892.

WITNESSES:
E. B. Bolton
A. G. Büsing

INVENTOR
Angelo Tessaro
BY
Richards &
ATTORNEYS (No Model.) 14 Sheets—Sheet 5.
A. TESSARO.
APPARATUS FOR WRITING MUSIC.
No. 484,262. Patented Oct. 11, 1892.
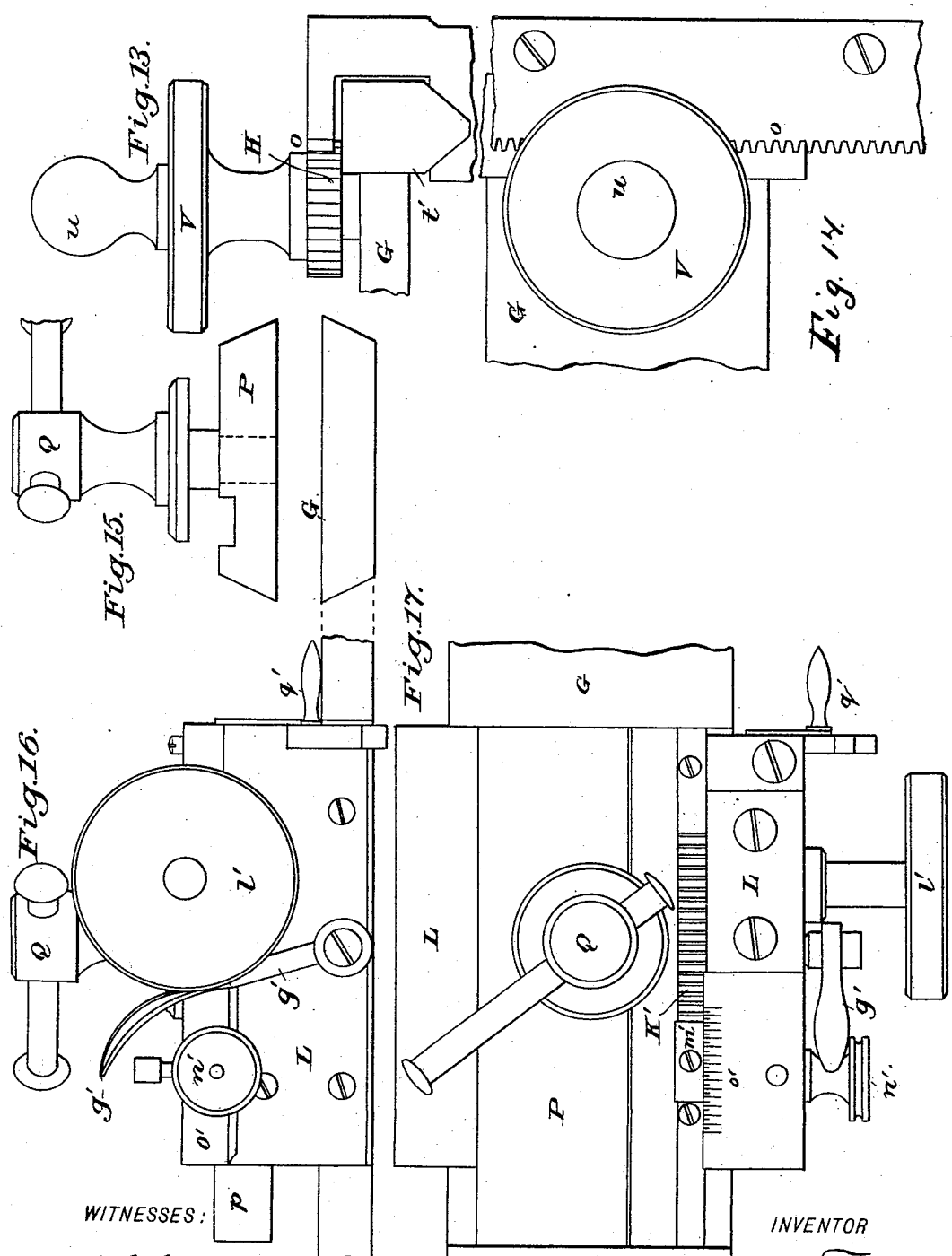
WITNESSES:
INVENTOR
Angelo Tessaro
BY
ATTORNEYS (No Model.) 14 Sheets—Sheet 6.

A. TESSARO.
APPARATUS FOR WRITING MUSIC.

No. 484,262. Patented Oct. 11, 1892.

WITNESSES:
E.B.Bolton
J.S.Brising

INVENTOR
Angelo Tessaro
BY
Richards
ATTORNEYS (No Model.)
14 Sheets—Sheet 7.
A. TESSARO.
APPARATUS FOR WRITING MUSIC.
No. 484,262. Patented Oct. 11, 1892.
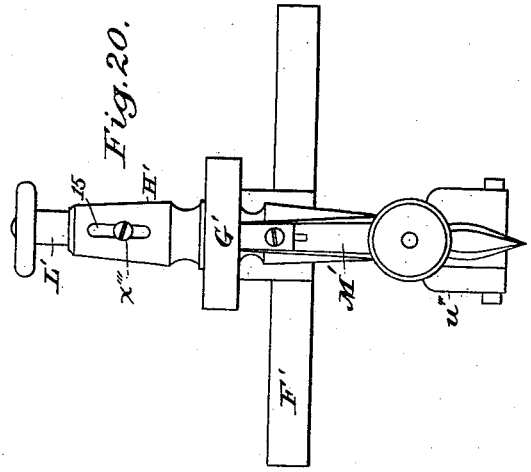
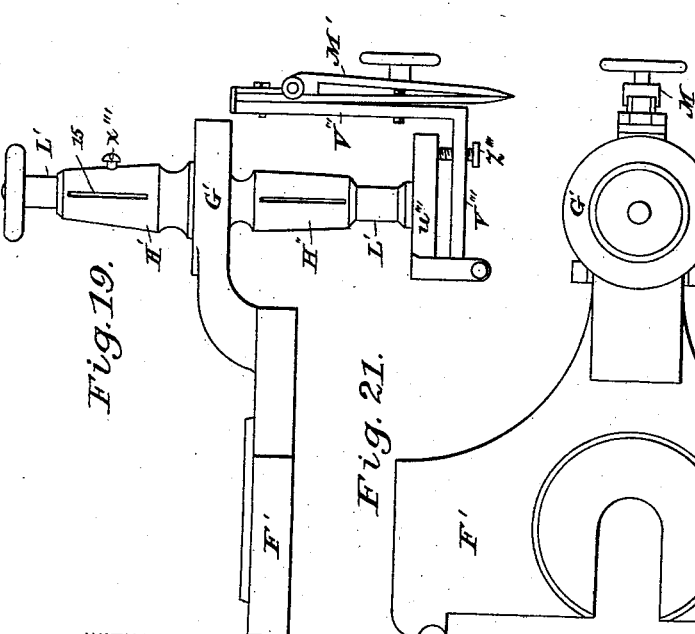
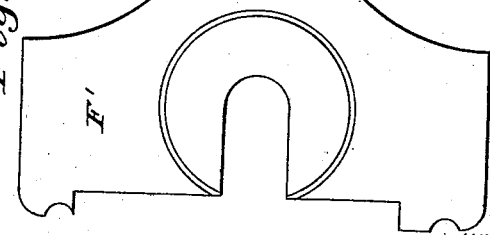
WITNESSES:
INVENTOR
BY
ATTORNEYS (No Model.) 14 Sheets—Sheet 8.
A. TESSARO.
APPARATUS FOR WRITING MUSIC.
No. 484,262. Patented Oct. 11, 1892.
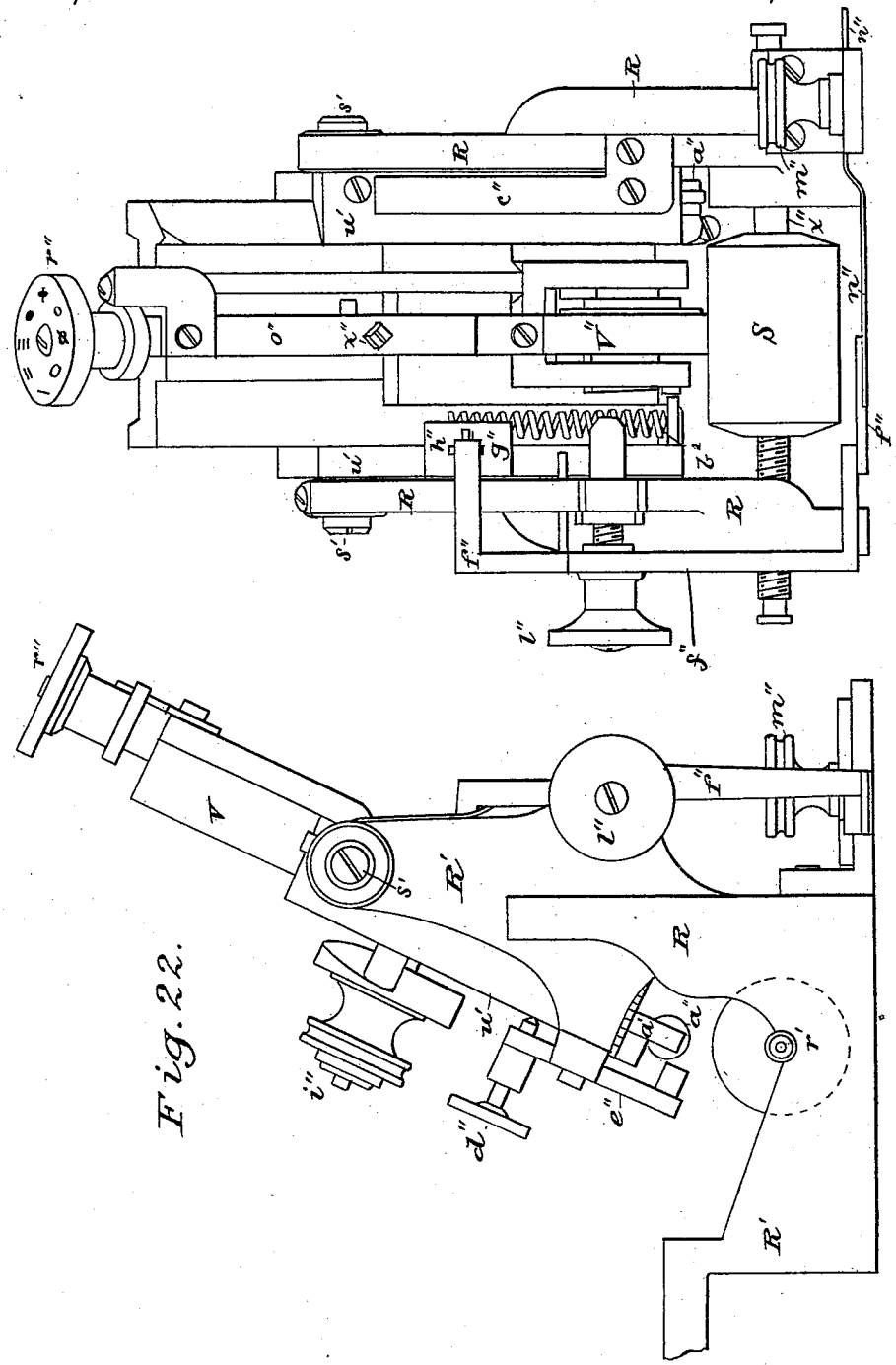
WITNESSES:
INVENTOR
Angelo Tessaro
BY
ATTORNEYS (No Model.) 14 Sheets—Sheet 9.
A. TESSARO.
APPARATUS FOR WRITING MUSIC.
No. 484,262. Patented Oct. 11, 1892.
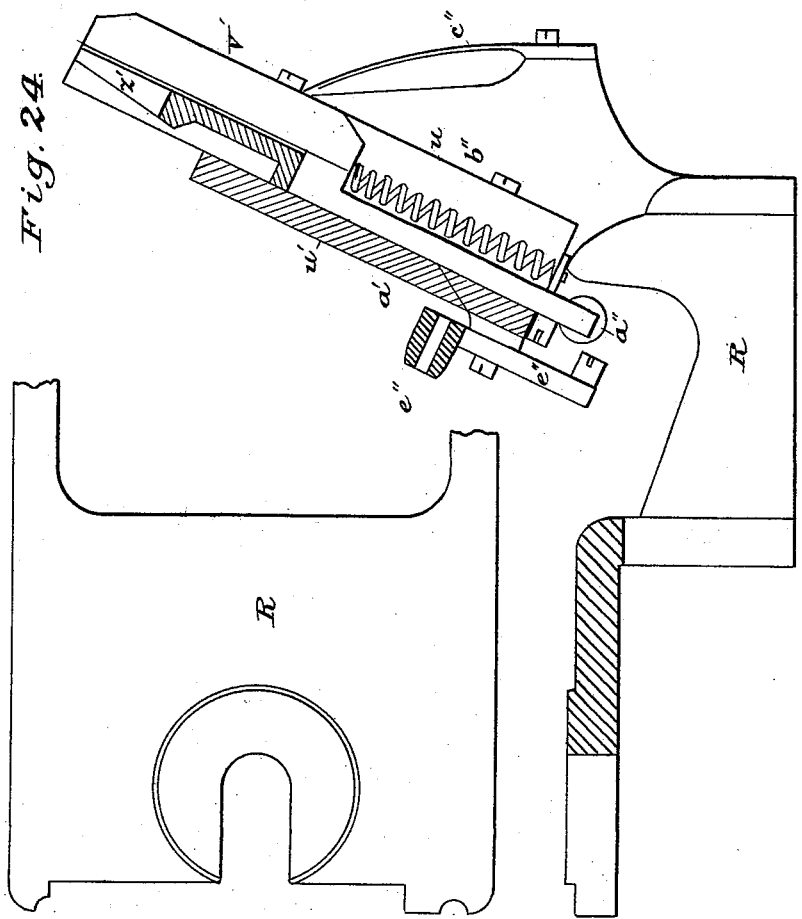
WITNESSES:
C. B. Bolton
A. S. Bising
INVENTOR
Angelo Tessaro
BY
Meuardst
ATTORNEYS (No Model.) 14 Sheets—Sheet 10.

A. TESSARO.
APPARATUS FOR WRITING MUSIC.

No. 484,262. Patented Oct. 11, 1892.

WITNESSES:
E. B. Bolton
A. S. Büsing

INVENTOR
Angelo Tessaro
BY
Richards
ATTORNEYS (No Model.) 14 Sheets—Sheet 11.

A. TESSARO.
APPARATUS FOR WRITING MUSIC.

No. 484,262. Patented Oct. 11, 1892.

WITNESSES:

INVENTOR
Angelo Tessaro
BY
ATTORNEYS (No Model.) 14 Sheets—Sheet 12.
A. TESSARO.
APPARATUS FOR WRITING MUSIC.
No. 484,262. Patented Oct. 11, 1892.
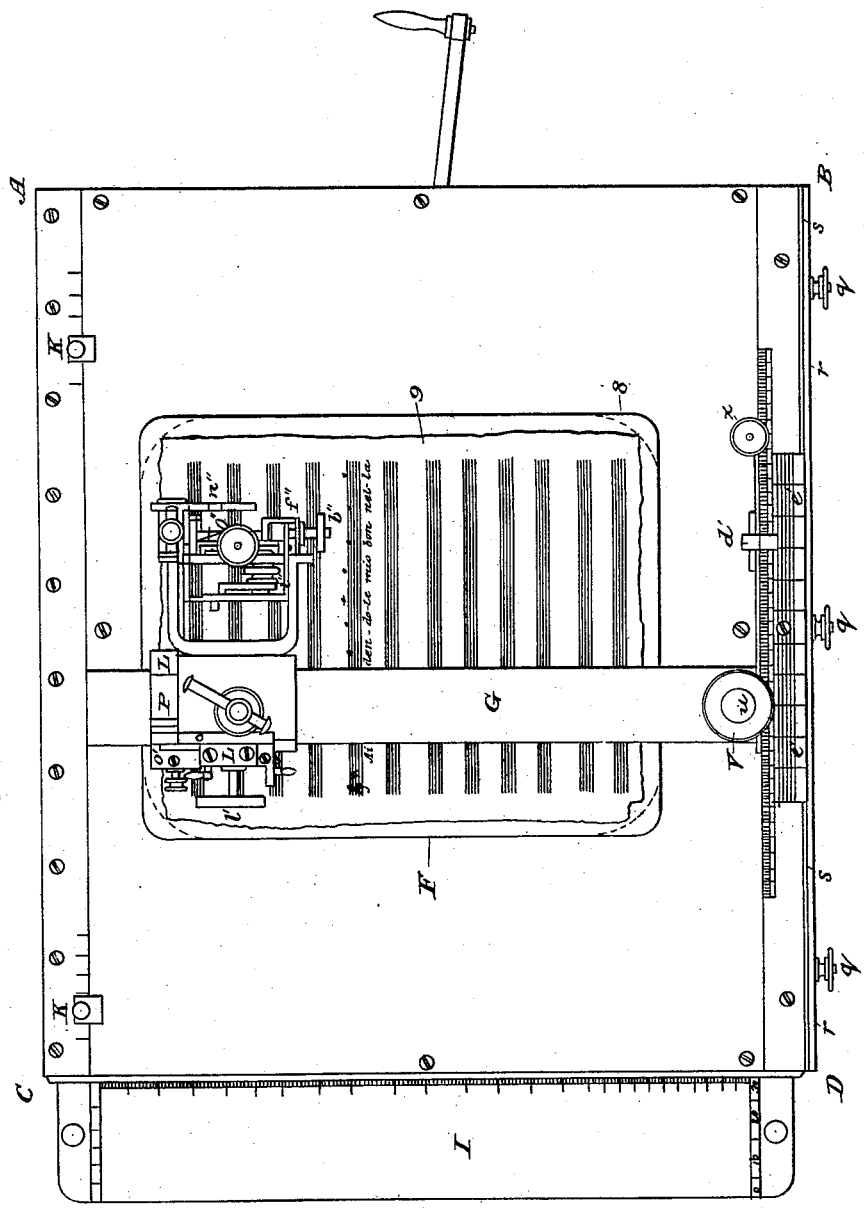
WITNESSES:
E.B.Bolton
A.S.Büsing
INVENTOR
Angelo Tessaro
BY
ATTORNEYS (No Model.) 14 Sheets—Sheet 13.

A. TESSARO.
APPARATUS FOR WRITING MUSIC.

No. 484,262. Patented Oct. 11, 1892.

WITNESSES:
C. B. Bolton
N. S. Büsing

INVENTOR
Angelo Tessaro
BY
ATTORNEYS (No Model.) 14 Sheets—Sheet 14.
A. TESSARO.
APPARATUS FOR WRITING MUSIC.

No. 484,262. Patented Oct. 11, 1892.

WITNESSES:
J. B. Bolton
H. S. Büsing

INVENTOR
Angelo Tessaro
BY
Richards
ATTORNEYS

UNITED STATES PATENT OFFICE.

ANGELO TESSARO, OF PADUA, ITALY.

APPARATUS FOR WRITING MUSIC.

SPECIFICATION forming part of Letters Patent No. 484,262, dated October 11, 1892.

Application filed April 2, 1890. Serial No. 346,364. (No model.)

*To all whom it may concern:*

Be it known that I, ANGELO TESSARO, a subject of the King of Italy, and a resident of Padua, Italy, have invented a new and useful Improved Apparatus for Writing Music, of which the following is a specification, reference being had to the accompanying drawings.

This invention relates to an improved apparatus for writing music upon suitable material.

By employing the new apparatus the cost of printed music is greatly reduced as compared with that of the systems in general use. Another advantage is that it admits of the employment of comparatively-unskilled workmen. The lines, notes, and signs used in music are not placed, traced, or engraved, as is usual, by hand, a system which demands the employment of a highly-trained working staff; but the tracing is effected by means of the apparatus represented in the annexed drawings.

Figure 4:
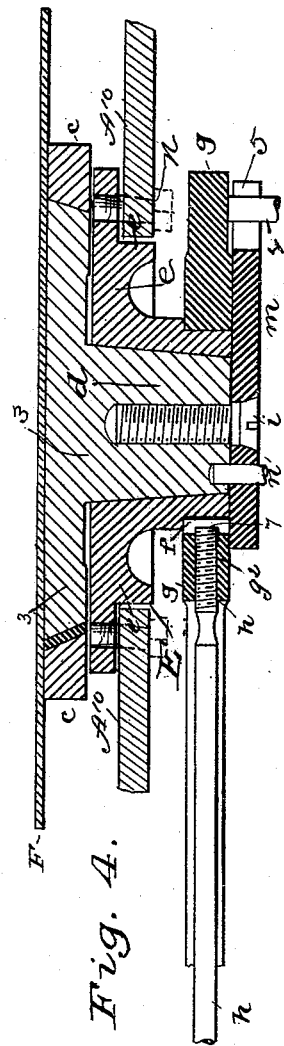
Figure 11:
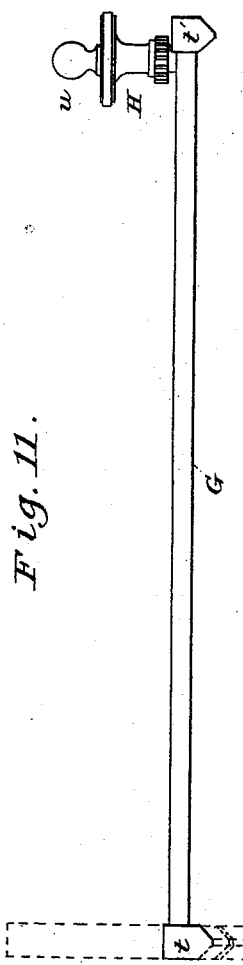
Figure 12:
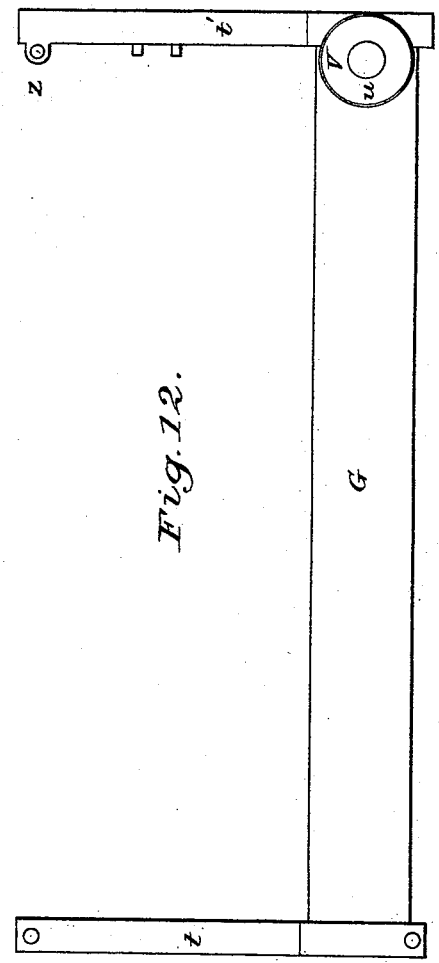
Figure 9:
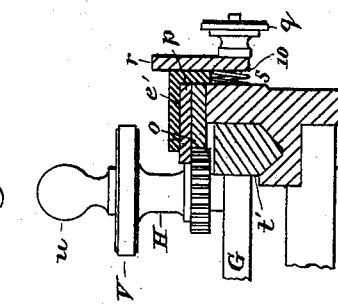
Figure 10:
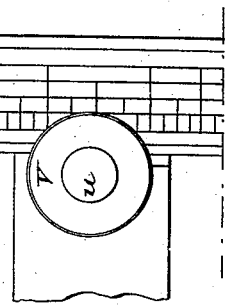
Figure 18:
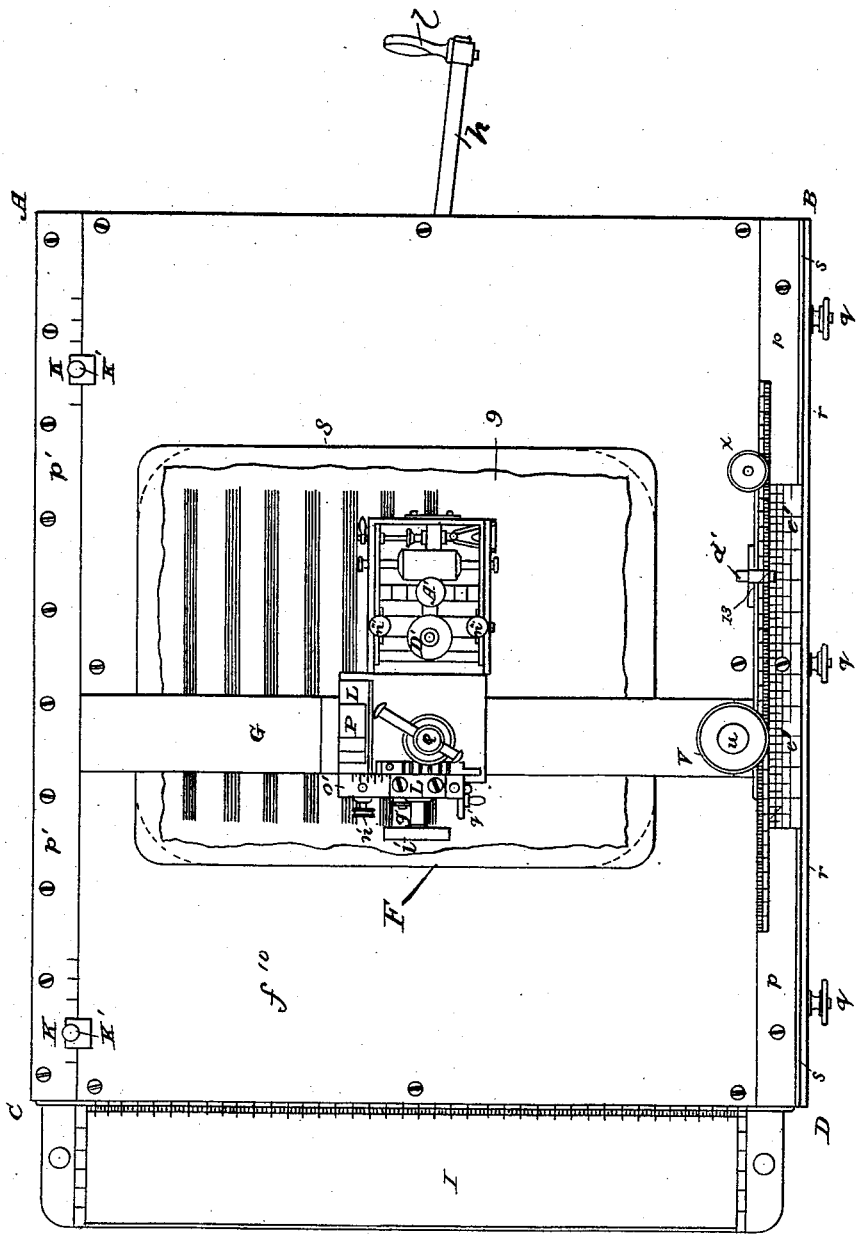
Figure 30:
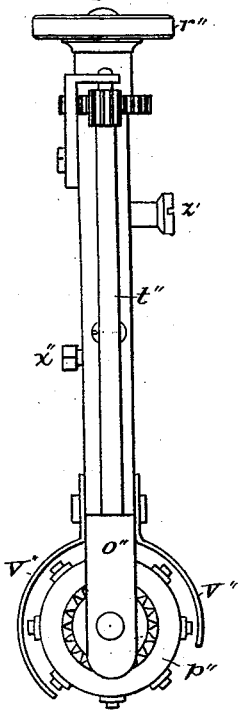
Figure 31:
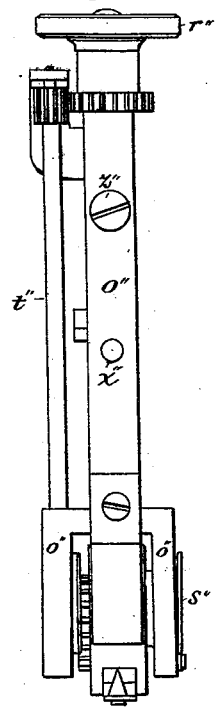
Figure 32:
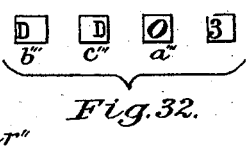
Figure 33:
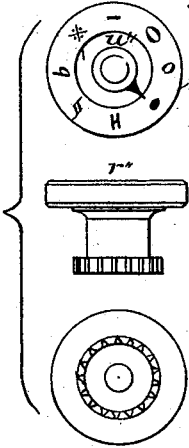
Figure 34:
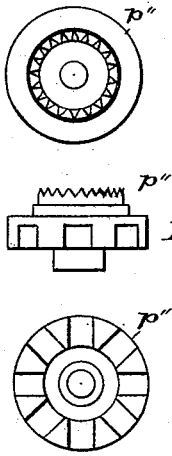
Figure 35:
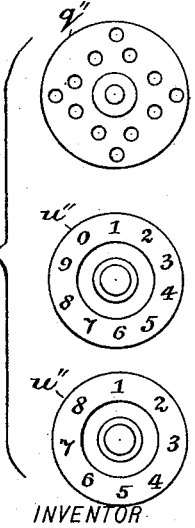
Figure 36:
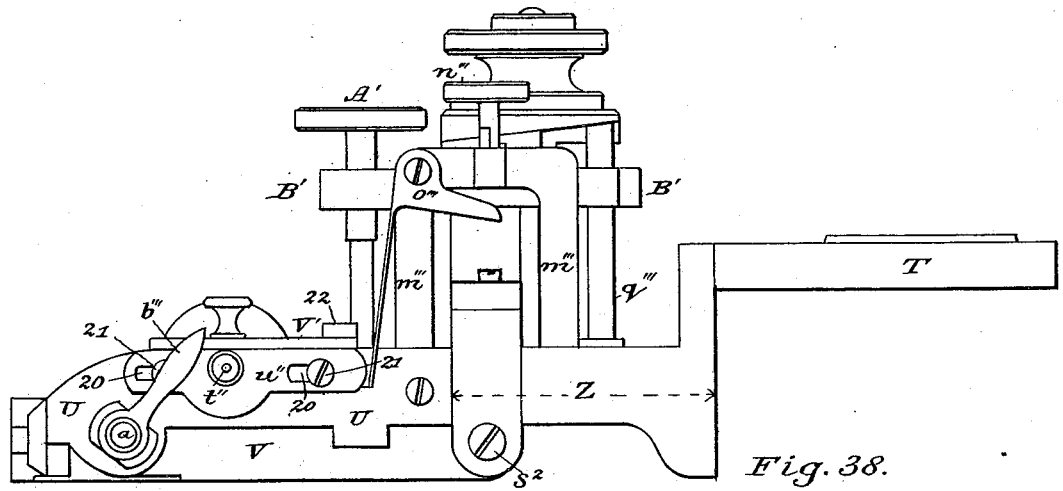
Figure 38:
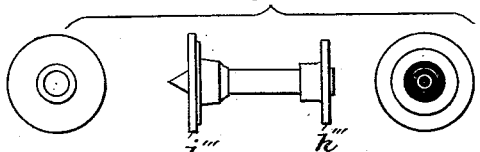
Figure 37:
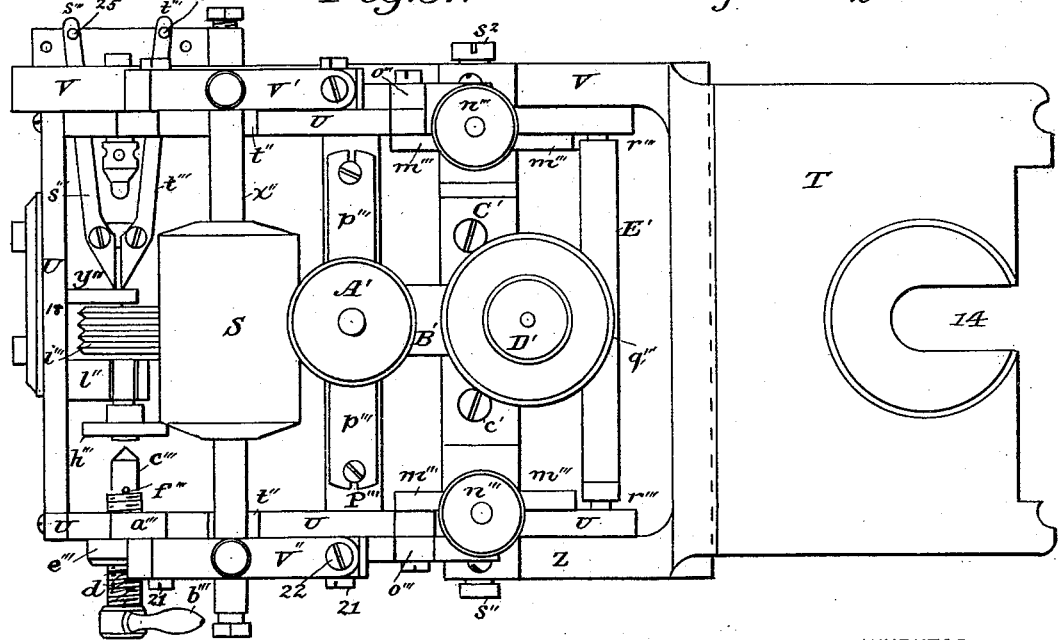
Figure 40:
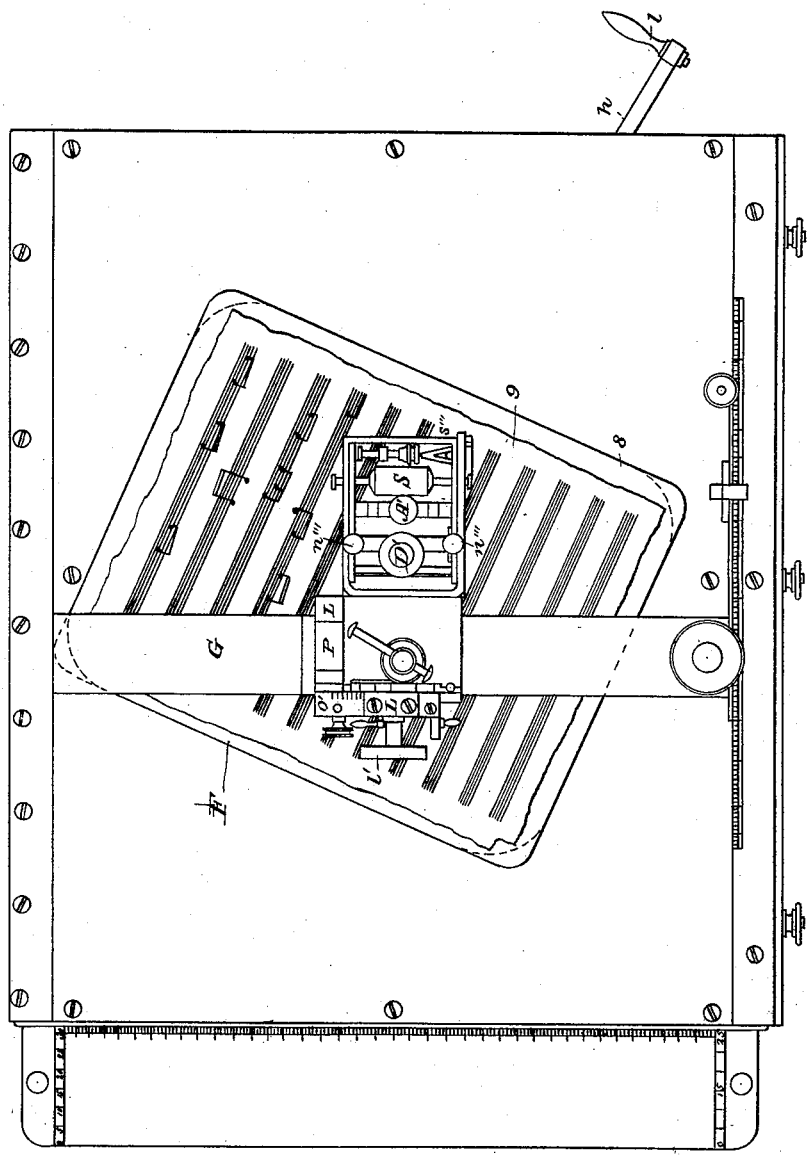
Figure 41:
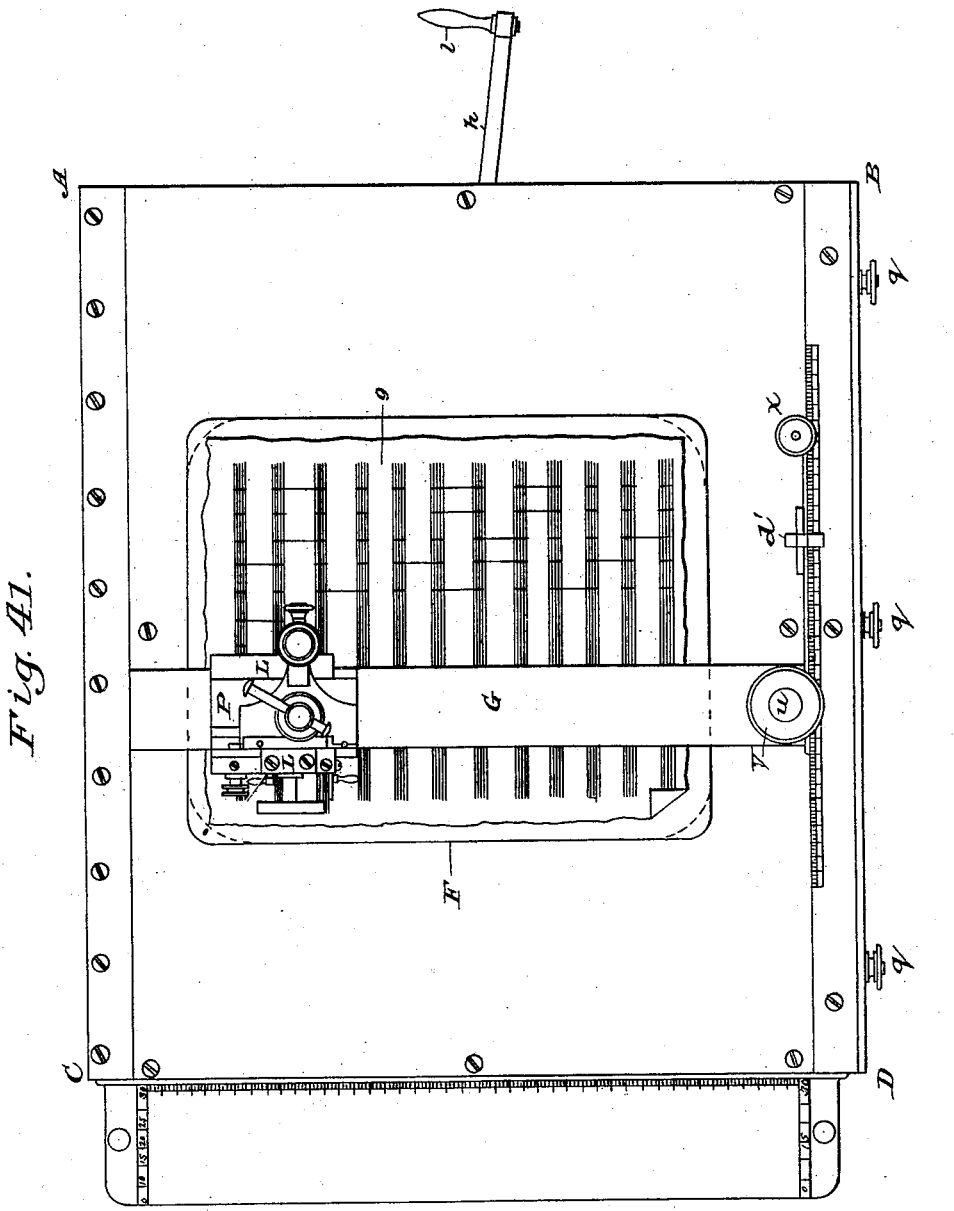

Figure 1 is a plan of the frame of the machine. Fig. 2 is a section of the same on line $x\,y$ of Fig. 1. Fig. 3 is a detail plan view. Fig. 4 is a vertical section of the same on line $z\,v$, Fig. 3. Fig. 5 is a longitudinal sectional view of side B D of the frame with the parts mounted thereon. Figs. 6 and 6ª are detail views. Figs. 7 and 8 are views of spring $a'$. Fig. 9 is a detail sectional view of the device for moving cross-bar G. Fig. 10 is a plan view of the same. Fig. 11 is a side elevation of cross-bar G. Fig. 11ª is a sectional view of the parts shown in Figs. 2, 4, and 11 combined in proper relation. Fig. 12 is a plan view of the cross-bar G. Fig. 13 is a detail view of the rack and pinion for moving cross-bar G. Fig. 14 is a plan of the same. Fig. 15 is a view of the binding-block for holding block L in place. Fig. 16 is a side elevation of sliding block L and its connections, and Fig. 17 is a plan of the same. Fig. 18 is a plan view of the machine with the spacing device attached. Figs. 19, 20, and 21 are respectively side, front, and plan views of the ruling device. Fig. 22 is a side elevation of the stamping device. Fig. 23 is a rear view of the same with the inking-roller attached. Fig. 24 is a sectional side view of part of the stamping device. Figs. 25 and 26 are detail views. Fig. 27 is the frame for attaching the stamping device to cross-bar G. Figs. 28, 29, 30, and 31 are views of the type-carrier. Fig. 32 represents some of the type. Fig. 33 represents a top, side, and bottom view of the top knob $r''$. Fig. 34 represents similar views of type-wheel $p''$. Fig. 35 represents detail views of the type-carrier. Fig. 36 is a side view, and Fig. 37 is a plan view, of the spacing devices. Fig. 38 is a detail of one form of roller. Fig. 39 is a plan view of the machine with the stamping device attached thereon. Fig. 40 is a view similar to Fig. 18 with the plate F at an angle. Fig. 41 is a plan view of the machine with the ruling device attached.

The entire apparatus is mounted on a metallic frame A B C D, the plan of which is represented in Fig. 1, as seen from above. Fig. 2 is a section of the same frame on the line $x\,y$. The central part of the frame consists of a cross-bar $A^{10}$, in the center of which is a circular cavity E, and in the periphery of this there are made notches. In Fig. 2 is seen a transverse section, with the grooves $a\,b$ extending all along the sides A B C D of the frame. When the apparatus is put in working position, the surface of the frame on which are formed the grooves $a\,b$ faces upwardly, while the prolongations 1 2 of its lateral walls A B C D rest upon the work-table.

The cavity E is intended to receive the parts represented in plan, as seen from below at Fig. 3 and in vertical section on the line $z\,v$ in Fig. 4. The parts enter the cavity E of the principal frame, Figs. 1 and 2. The annular edge plan of the collar-bearing $e$, Figs. 3 and 4, rests and is bolted at $n$ on the annular edge of the cavity E, Fig. 2, placed on a lower level than that of the surface of the frame bearing the grooves $a$ and $b$. The collar-bearing $e$ receives a conical pivot $d$, adapted to turn in said bearing $e$. To the lower end of the pivot $d$ a plate $m$ is bolted by means of the central screw $i$. Above the bearing $e$ the pivot $d$ has formed therewith a platform 3, which can turn in the interior of the cavity E, Fig. 1, of the principal frame. On the platform, which terminates above the part $d$, is mounted an iron plate F, Figs. 3 and 4, bearing directly the plate of zinc or other metal on which is fixed the material on which the musical signs or notes are to be traced. The plate F when the apparatus is set in order is on a higher level than that of the upper surface of the main frame, on which the grooves $a$ and $b$ are traced. On the lower surface of F, Figs. 3 and 4, are fixed the gibs $c$, which can slide along the rectilinear sides of the platform carried by the pivot $d$. Thus I am enabled to give to F, and consequently to the sheet of paper, a displacement perpendicular to the plane of Fig. 4. In whatever position it may happen to stop in its course along the rectilinear sides of the platform the plate F remains in its place by virtue of its own weight without the need of any special stop. The lower part of the bearing $e$ is surrounded by a ring $g$, provided with a pin 4, (visible in Fig. 3,) which enters the branches of a lateral fork 5 in prolongation of the plate $m$. To the ring $g$ are united two converging arms, (marked by the letter $g'$, Fig. 3,) which end in a socket $g^2$ at their inner ends. This socket is traversed by a rod $h$, which ends in a crank $l$, keyed upon it. This crank is not visible in Figs. 3 and 4, but it may be seen in Figs. 18 and 41. The rod $h$, Figs. 3 and 4, is threaded at the interior end and penetrates the ring $g$, which acts as a female screw. The interior extremity of the rod $h$ is provided with a key $f$, resting in a notch corresponding to it and formed in the thickness of the bearing $e$.

It follows from the above description that when the key $f$ is withdrawn from its corresponding notch the ring $g$ can be turned by means of the rod $h$ and the crank $l$ around the bearing $e$, and consequently around the vertical axis of the device. The ring $g$ turns with it in its movement the plate $m$, and the plate F also turns therewith.

The rotation of $g$, and consequently that of F, is limited, because the rod $h$ strikes against the wall A C or B D of the main frame every time that it reaches one or the other end of its travel. The movement of the plate F upon the pivot-plate $d$ is similarly limited, because the gibs $c$ strike against the interior periphery of the cavity E of this frame. Now suppose the crank $l$ to be turned so as to communicate a rotatory movement to the rod $h$ around its axis. If this movement takes place in the due direction, the screw-threads with which $h$ is provided enter the socket $g^2$ of part $g$ and the key $f$ penetrates the notch 7 in the bearing $e$. The entire mechanism then remains fixed to the bearing $e$, and consequently becomes absolutely immovable so far as the rotation is concerned. The rotation of the plate F is thus entirely prevented. Therefore the following results can be obtained by the contrivance hereinbefore described: First, plate F may have a movement of translation parallel to the rectilinear sides of the upper surface of the part $d$; second, plate F may be caused to turn around the vertical axis of the apparatus when $f$ is withdrawn from the corresponding notch in the bearing $e$; third, the position of plate F can be fixed so far as rotation is concerned.

Fig. 18 presents a complete plan of the apparatus when ready to trace the lines which form the staff on the sheet of paper. Here are shown the rod $h$ and the crank $l$. The plate F is represented in dotted outline in the middle of the frame. The zinc plate 8 and the sheet of paper 9 are placed upon it. The parts of the frame comprised between the central pivot $d$ and the frame represented in open-work at Fig. 1 are covered in Fig. 18 with a thin plate of sheet-iron $f^{10}$. This plate provides a flat surface or table. The grooves $a$ and $b$, Fig. 2, extend the whole length of the sides A C B D.

A transverse perpendicular section of the side C A, Fig. 18, of the apparatus is shown in Fig. $6^a$, which shows one of the walls of the main frame with one of the longitudinal grooves $a$ $b$, Fig. 1, which extends for the entire length of this wall.

An inspection of Figs. $6^a$ and 18 will show that when the apparatus is ready for action the upper surface of the side A C of the frame, Fig. 18, is surmounted by a bar $p'$, bolted upon it. Fig. 6 shows these parts in front elevation. Along the bar $p'$ slide the movable clamps $k$, clasping $p$, which clamps can be secured to bar $p'$ by means of thumb-screws $k'$. The clamps $k$ may be fixed in various positions, to be determined by circumstances, by means of the parts of a graduated scale situated on bar $p'$, Fig. 18. The other side B D of the apparatus is shown in transverse section in part plan in Fig. 10 on an enlarged scale as compared with that of Fig. 18 and at Fig. 5 in elevation partly broken away and partly in section. The parts which surmount the upper plane of the side B D or lower side of the frame are, first, a toothed rack $o$. (See the transverse section in Fig. 9, front elevation in Fig. 5, detail in Fig. 14, and end view in Fig. 13.) A bar $p$ surmounts the rack and is provided with a graduated scale along its interior side. The bar $p$ is surmounted by another piece $e'$ for a portion of its length, Figs. 9 and 18; but this is not screwed directly on the upper plane of the side B D of the main frame, as is, on the contrary, the case with $p$ and $o$. Exteriorly on the side B D of the frame, Fig. 18, and all along it is placed upright a bar $r$, Fig. 18 in plan and Fig. 9 in vertical section, which is held in its place by three screws $q\ q$, Figs. 18 and 9. A spiral spring 10, Fig. 9, is interposed between the lateral wall of the frame and the bar $r$, so that the screws $q$ being all well tightened, there still remains a space between $r$ and the wall above mentioned. In this space, which is indicated by the letter $s$, forming a longitudinal slit along the vertical exterior wall of the frame, the graduated scale $e'$, in the form of an angle-iron, is inserted. The graduations of this scale correspond to those of a musical measure. This scale is held in its place by the screws q, Fig. 9, with one of their sides (the vertical side) in the space between the bar r and the exterior faces of o and p, forming a continuation of the exterior wall of the frame, while the other side (the horizontal side) lies directly upon the plate p, Fig. 9. The grooves a and b of Fig. 2 thus form two covered channels. These two channels serve to conduct the sliding bar G, Fig. 18, which I call the "main sliding carrier," intended to be moved along the main frame. The main carrier G is shown in detail and separately in Figs. 11 and 12, the first of which is a front elevation and the second a plan seen from above. Arms $t\ t'$ are attached at a right angle thereto. These two arms $t\ t'$ slide in the covered channels formed by the grooves running along the sides of the apparatus. As may be seen on consulting Fig. 11, the arms $t\ t'$ are beveled on their lower faces and adapted to the form of the grooves in which they are intended to slide. Fig. $6^a$ shows in transverse section the arm $t$ inserted into its corresponding groove in the frame. Figs. 9 and 13 likewise show the arm $t'$ inserted into the opposite groove. A front elevation of the arm $t'$ is visible in Fig. 5, while in Fig. 6 is seen an elevation of the arm $t$. In these two figures the main carrier G is shown in transverse section. These two figures demonstrate that the arms $t$ and $t'$ are not in contact at their lower part with the grooves of the frame, except at their extremities, so that the frame formed by the parts G, $t$, and $t'$ is supported on four points placed two and two at the extremities of each of the arms $t$ and $t'$. In order that the frame may be guided perfectly throughout its movement, the arms $t$ and $t'$ carry on their upper faces screws $b'$, Fig. 6, which can be turned in such a way as to press their heads against the lower faces of parts $p'$ and $p$.

From the upper face of the carrier G projects at its extremity on the side of $t'$, at its lower extremity toward B D, Fig. 18, a fixed pin ending in the knob $u$, Figs. 9, 11, and 13 in elevation, Figs. 10, 12, 14, and 18 in plan. On the said pin is mounted and can turn a pinion H, Figs. 9, 11, and 13, the nave of which forms one sole piece with the washer V, Figs. 9, 11, and 13 in elevation, and Figs. 10, 12, 14, and 18 in plan. When the carrier G and its arms $t\ t'$ are in their places and the latter slide in their respective grooves in the frame, the pinion H catches the teeth of the rack o.

The carrier G may be moved rapidly by grasping the knobs and pressing the same laterally along the main frame, in which case the pinion, meshing with the rack, will turn freely on its axis. If it is desired to secure an accurate adjustment of the carrier, it is done by means of the pinion, which is turned by grasping the washer V, and thus the carrier will be moved only in proportion to the rotation of the pinion, which, as before stated, engages the stationary rack.

As may be seen in detail at Fig. 5, the arm $t'$ carries in a slit made in its upper face a flat spring $a'$. (Shown separately in elevation in Fig. 7 and in plan in Fig. 8.) One extremity of the spring $a'$ is fixed on the arm $t'$ and the other ends in two branches, between which is pivoted a roller $b^3$, which the spring $a'$ tends to press against the lower face of the rack o. The arm $t'$ carries a projection z. (Shown in elevation, Fig. 5, and in plan, Fig. 12.) In this is screwed the little vertical shaft $y$, Fig. 5, passing through the knob $x$, and which traverses at $c'$ the spring $a'$, which is thus inclosed between two shoulders of the stem $y$, Fig. 8. It follows that by turning the knob $x$ we can tighten at pleasure the roller $b^3$, Figs. 5 and 8, against the lower face of the rack o or detach it, and therefore render movable or immovable the carrier G. On the same arm $t'$ can slide the indicator $d'$, Fig. 5 in elevation and Fig. 18 in plan, which is provided with a slit in which are inserted two pins 11 and 12, projecting from the vertical face of $t'$ and which is kept in its place by a thumb-screw 13. This indicator is right-angled in shape, so that its horizontal arm surmounts the plate $p$. A broad plate I, provided with divisions, as seen in Fig. 18, may be provided on the side C D of the frame.

The carrier G is dovetailed in transverse section, Figs. 5 and 6. It is intended to receive a sliding block L. (Shown in Fig. 16 in elevation and in Fig. 17 in horizontal plan.) The block L may be fixed on G by means of the lever having a handle $g'$, Figs. 16 and 17, setting in motion a screw which penetrates the thickness of L and exerts its pressure on G. When this lever $g'$ is turned and the screw fixed on its axis is drawn back, the block L is free to slide with gentle friction along the carrier G. The block L has in its upper face another dovetail slot like the one seen below in the same piece and intended to receive the bar G. In this slot can slide the little plate P. (Shown in end elevation, Fig. 15, in a side view, Fig. 16, and in plan, Fig. 17.) P carries on the left side of its upper face a rack K'. The knob $l'$ forms part of a stem traversing the thickness of the block L and carrying at its other extremity a pinion, which catches the rack cut on the face of P. By turning the knob $l'$ I cause P to slide along the slot of the block L in which it is contained, the displacement of P with regard to the block L being effected with the precision of a micrometric movement. This displacement is regulated by bringing the indicator $m'$, Fig. 17, into contact with the graduated scale $o'$, Figs. 17 and 18, fixed to the block L by means of the screw $n'$ and changeable when required. Into the lower part of the sliding block L is fitted a pointer or indicator $q'$, which can slide in its sliding-groove, from which it can be almost entirely withdrawn. By means of the screw Q, I fasten on the plate P the different parts which I am about to describe.

*The ruling device*, (Figs. 36, 37, and 38.)—This apparatus is put in operation by fixing on the sliding block L, Figs. 15 and 17, the plate T, Figs. 36 and 37, by means of the slit 14 (visible in Fig. 37) in the manner just described. From the plate T project two arms, of which the longest is V and the shortest Z. These two arms sustain at $s''$ the pivots around which revolves the frame U, on which the most important parts of the apparatus are mounted. The frame U carries in its turn at its rear extremity the bearings $r'''$, in which rotates the shaft E'. From the middle of this rises the vertical stem $q'''$, which traverses the collar-bearing B'. The bearing B' is sustained by a bar C', fixed to the two arms V Z, forming part of the plate T. It is therefore independent of the frame U.

The essential parts of the ruling device are, first, the inking-roller S, Fig. 37; second, the ruling-disk, which may have either the form represented in $i'''$, Fig. 37, or that shown separately in $j'''$, Fig. 38. With the disk $i'''$ I can trace at the same time five parallel lines corresponding to the musical staff. The disk $j'''$, on the contrary, is intended to replace $i'''$ and to be mounted on the spot occupied by $i'''$ in Fig. 37 when it is my intention to trace isolated lines only.

The inking-roller S is formed of a composition obtained from a mixture of paste and honey. Before mounting it in its place in the ruling device the roller is inked by rubbing on a marble table moistened with the ink usually employed for transfer operations. The inking-roller S is mounted on an axle $x''$, provided with a cylindrical pivot at one of its extremities and a threaded pivot at the other. The frame U presents certain cavities in correspondence at the points $t''$ where it is traversed by the axle $x''$ of the roller S. The pivots of the axle $x''$ enter the bearings $u''$, fixed on the frame U. These latter can be moved in a longitudinal direction by means of the end slots 20, through which pass the set-screws 21. (See Figs. 38 and 39.) These bearings are covered by the movable lids $v'$ and $v''$, which are secured on said bearings by screw 22. Of these two bearings that which is intended to receive the threaded pivot is threaded in its turn in such a way as to act as a female screw, wherefore the rotation of the inking-roller S is accompanied by a transport movement in the direction of its axis. It will thus be seen that by this horizontal movement of the roller the surface will not become worn in one place more than in another. This construction is set forth in Figs. 23 and 27, especially the former figure. The frame U is traversed on one of its sides and precisely at $a'''$ by a socket $e'''$, which is screwed into U and ends exteriorly in a broad head, and toward the interior of the frame U is a helicoidal rim occupying the fourth part of the periphery of the socket $e'''$. In the interior of this socket is inserted a little stem $c'''$, having at one of its extremities the crank $b'''$ and ending in a point at the other. From this little stem $c'''$ projects a stud $f'''$. A spiral spring $d'''$, surrounding the stem $c'''$, is inserted between the socket $e'''$ and the nave of the crank $b'''$. The spring helps to keep in place the stud $f'''$, adhering to the exterior rim of the socket $e'''$. If I turn the crank $b''$, $f'''$ being forced to follow the circumference of the helicoidal surface which bounds the socket interiorly, the stem $c'''$ is displaced axially. As soon as $f'''$ has run over the whole of the helicoidal circumference the stem $c'''$ comes to a stop. In order to bring it back, the crank $b'''$ must be turned in the opposite direction. The interior crossbar 18 of the frame U carries at about half its length a support $y''$ after the form of a T, which can be adjusted and fixed in its place by means of screws. On the surface of that arm of $y''$ which extends toward the interior of the frame U and on the same side as the socket $e'''$ a pointed notch is made, which will be found precisely on the prolongation of the axis of the stem $c'''$. It is between the cavity at $y''$ and the pointed extremity of the stem $c'''$ that the ruling-disk $i'''$, Fig. 37, or $j'''$, Fig. 38, is pivoted. These disks are usually made of ivory. They are mounted on side $y''$ and present a small cavity at the side $c'''$. The ruling-disks, whether those having five tracing-edges $i'''$, Fig. 37, or those having only one, are connected by means of their axles with a washer $h'''$, (see Fig. 38,) applied to the extremity of the latter, Figs. 37 and 38. This washer serves, also, to hold the piece for the purpose of lifting it or to insert the axle in the fixed bearing $l'''$ fitted to the anterior cross-piece of the frame U. The ruling-disk once in its place, it is fixed there in the way described by turning the crank $b'''$. The frame U is surmounted at each side by a piece $m'''$, in the form of a bridge, each end of which is traversed by a thumb screw $n'''$. When the head of one of the screws $n'''$ is turned, the shorter arm of one of the bell-crank springs $o'''$, pivoted on $m'''$, is acted upon. The longer arms act in their turn on the movable bearings $u''$ of the pivots of the axle $x''$ of the roller S and tend to push the latter against the surface of the ruling-disk $i'''$, Fig. 37, or $j'''$, Fig. 38, when the screws $n'''$ receive a descending movement. As the ruling-disk, drawn along by the transfer movement of the sliding block applied to the main carrier, travels over the surface of the prepared paper intended to receive prints while turning around its axis this transport movement, as mentioned above, is accompanied by a transport movement of the inking-roller in the direction of its axis, which movement has the effect of contributing to the preservation of the inking-roller itself, as it thus wears itself uniformly on all its lateral surface. In the support B', joined, as has been said, to the arms V Z, and consequently to the plate T, through the medium of the cross-piece C', enters the thumb-screw A', which transmits its pressure through the medium of the bent spring $p'''$ to another cross-bar P''', placed beneath $p'''$ and forming part of the frame U. It is thus seen that all that is required is to turn the head of the screw A' when I desire to augment or diminish the pressure which the ruling-disk exerts on the prepared surface destined to receive impressions. In short, when the screw A' is lowered all that part of the frame U which is situated to the left of the points $s''$, around which this frame pivots, is depressed. The movement of A' is resorted to only when the ruling-disk remains in constant contact with the prepared surface, and all that is in question is to modify the pressure on the former. On the contrary, to detach the ruling-disk entirely from the sheet or to re-establish their contact the knob D' is used, which also is mounted on the same bearer B' and provided along its lower base with an inclined surface resting on the rod $q'''$, joined to the stem E', and consequently to the frame U. When the knob D' is pressed, so as to lower $q'''$, that part of the frame U which is situated to the right of the pivots $s''$ is also lowered, and consequently that situated to the left (the disks $i'''$ or $j'''$ included) is raised and detached from the prepared surface in such a manner as to permit the displacement of the sliding block and of the ruling device attached to it without leaving any trace whatever on the said surface.

The edges of the ruling-disks $i'''$, as well as the prepared surface, not being bodies absolutely and geometrically rigid, but formed necessarily of elastic substances, the shape of which is altered when subjected to a certain amount of pressure, it follows that the contact between the ruling-disk and the sheet which is to receive impressions does not take place along a geometrical line, (the generating-line of the cylindrical surface of the disk which lies in its tangential plane,) but along a horizontal flat surface having an appreciable width. Wherefore, instead of obtaining points or lines on the paper, I obtain small lines or small rectangles. It is of the greatest importance to individuate the extreme points of the lines and of the rectangles with the utmost exactness, in order that all the lines traced by the ruling-disk may be prevented from passing beyond the points at which they ought to stop or from stopping short of these points. This object is obtained by means of the pointer with movable branches $s''' t'''$, these branches being capable of approach to or separation from one another, according to the thickness of the lines which the ruling-disk is prepared to trace by means of the handles 25 26, forming part thereof.

*The printing device,* (Fig. 22, exterior lateral elevation; Fig. 23, front elevation; Fig. 24, vertical section passing by the longitudinal plan of the center.)—This apparatus is mounted in the sliding block L, Figs. 15, 16, and 17, in exactly the same manner as in the case of the ruling device—that is to say, by adjusting the plate R, Fig. 27, on the plate P, Figs. 15 and 17, by means of the screw Q.

The printing device consists of four principal parts, which are as follows:

First. The frame R. (Seen in exterior lateral view at Fig. 22, in section passing along its center longitudinal plane at Fig. 24, and in front elevation at Fig. 23.) This frame is prolonged at its rear side by the slit plate, shown separately in plan, as seen from above at Fig. 27, and serving, as above said, to adjust the whole apparatus on the sliding block. The principal part of the frame is composed, as seen in the figures, of two vertical and lateral walls R', following on both sides the above-mentioned slit plate, these two large lateral walls being joined together by means of a cross-bar $e''$, Figs. 22 and 24.

Second. A stem $u'$, Figs. 22, 23, and 24, in the form of a slide-box pivoting on the fixed pins $s'$, Figs. 22 and 23, inserted in the walls of the bearer R.

Third. A slide $v'$, Figs. 22 and 23, also represented separately in front elevation, Fig. 26, and in transverse section, Fig. 25. This slide $v'$ is inserted in the grooves, as seen at Figs. 22, 23, and 24, of the stem $u'$ and can slide in the interior of the latter, which, on the contrary, is immovable so far as lateral movement is concerned and can only rotate round the pins $s'$.

Fourth. The bar carrying the dies or types, which is shown separately at Figs. 28 to 35, which is independent of the rest of the apparatus and removable, but which when used is inserted into the slide $v'$, as is, in fact, shown at Figs. 22 and 23, where the printing device is shown completely mounted and furnished with its type-bar. The inclined position of the stem $u'$ is preserved by the spring $c''$. (Shown in lateral elevation, Fig. 24, and in front, Fig. 23.) This inclination is controlled by the thumb-screw $d''$, Fig. 22, inserted in $e''$, Figs. 22 and 24, this latter piece being, as already stated, joined with the vertical walls of the frame R.

Figure 28:
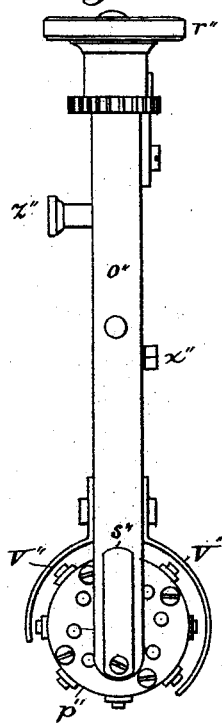
Figure 29:
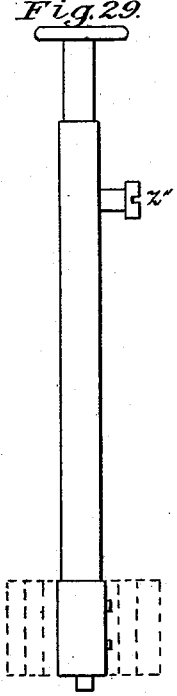

The slide $v'$ presents on its front face a rectangular smooth channel 1 and an oblique slot $z'$. This latter passes through its entire thickness. The channel 1 and the slot $z'$ are intended to receive the type-bar, as will be explained farther on. The sides of the slide $v'$ extend downward by means of the arm $a'$, Figs. 24 and 26, which is provided with a roller $a''$, Figs. 22, 23, and 24, at its lower extremity. Two spiral springs $b''$, Figs. 23 and 24, rest below on the stem $u'$ and are intended to push up the slide $v'$, keeping it raised at the upper extremity of its travel in the stem $u'$. At one side of the frame R is pivoted the indicator $f''$, which is a lever of the first order, bent at both ends, ending at its upper extremity in a roller $g''$ and terminating below in a point. This indicator is capable of receiving two different movements—that is to say, first, a transfer movement parallel to the axle on which it is pivoted, this movement being communicated to it by means of the knob-screw $l''$; second, a movement of rotation round its axle, which can be communicated to it by turning the thumb-piece $i''$, which has on its interior base an inclined surface acting on the pin $h''$, Fig. 23, against which the roller $g''$ is pushed by a bent spring. (Visible in Fig. 24.) On the side of the bearer R opposite the side on which is the indicator $f''$ is fixed the scale $n''$ by means of the screw $m''$. On this scale are traced spaces corresponding to the musical staff. The scale $n''$ can be changed according to the width of the staff which is used at a given moment. The inking-roller S is exactly like that employed in the ruling device, being also mounted on an axle $x''$, having a threaded pivot on one side and a cylindrical one on the other side, turning in their bearings $r'$, of which one is threaded in such a manner as to serve, also, as a female screw. Figs. 28, 30, and 31 represent the two first lateral elevations and the third a front elevation of the type-bars, which are fixed on the slide $v'$ of the printing device when it is desired to use the latter. The bar $o''$ ends below in a fork, to the interior of which is pivoted the roller $p''$, containing a series of dies or types corresponding with the different notes, characters, or marks to be written. The roller $p''$ is shown separately in lateral elevation in plan seen from above and in plan seen from below in Fig. 34. The printing dies or types are inserted in radial compartments intended to receive them and kept in their places by the cover $q''$, which is shown separately in Fig. 35 (the upper portion of it) and is seen, also, in the lower part of Fig. 28, where the roller $p''$ is shown turned toward the cover. The roller $p''$ when rotating on the pivots inserted in the fork $o''$ can be stopped in as many positions as there are dies or types in the compartments into which it is subdivided. The cover $q''$, Figs. 28 and 35, is furnished with notches, each one of which corresponds to one of the said compartments. A pin $s^5$ is pushed by the spring $s''$, Figs. 28 and 31, so as to enter these notches, and when it has been introduced therein it stops the roller $p''$ in whatever position may be desired. Each of the types or dies contained in the roller $p''$ can be placed in a position corresponding to the impression by means of the finger-piece $r''$, Figs. 22, 23, 28, 30, and 31. (Seen, also, in elevation, in plan seen from above, and in plan seen from below in Fig. 33.) The finger-piece $r''$ is provided below with a spur-wheel. The roller $p''$ carries in its turn a concentric crown-wheel. Motion is communicated between these two toothed wheels by the shaft $t''$, Figs. 30 and 31, and the pinions mounted on the latter. The finger-piece $r''$ (shown in plan as seen from above, in elevation, and in plan seen below at Fig. 33) has cut in its upper surface, as on that of a dial, signs or characters corresponding to those contained in the roller $p''$. Fig. 33 (the upper portion) and Fig. 35 (the middle and lower portions) present as specimens some of the signs which may be found on the upper face of $r''$ and which correspond to as many different characters, numbers, and musical signs situated in the periphery of the roller $p''$. The bar $o''$ is provided with an index or pointer $u''$. The index travels the plane upper surface of the finger-piece $r''$ in such a manner that the person who turns the finger-piece $r''$ sees at a glance which die or type in the roller $p''$ is at any given moment brought to the proper position for leaving its mark on the paper. The two curved plates $v'' v''$ protect the types while the type-bar is being handled. The bar $o''$ carries the headed screw $z''$ and the adjusting-screws $x''$. The usual type-bar, Figs. 28, 30, and 31, is replaced, when necessary, by the bar represented in Fig. 29, which is so disposed as to carry one sole die or type when this is of too great dimensions to enter the roller $p''$. As may be seen on reference to Fig. 32, the musical notes and signs are cast in such a manner that their center of figure corresponds to the center of the square $a''$, from which they project. The letters and numbers, as they have no symmetrical axis, are cast so as to be tangential to the borders of the squares $b''' c'''$, Fig. 32, whether toward the right or toward the left, according to the right or left direction which it is desired to follow while making up the composition. The type-bar is adjusted on the slide $v'$ by introducing the pins $z''$, Figs. 28 and 31, in the notch $z'$, Figs. 24 and 25, as may be seen in Fig. 22. The bar $o''$ then rests with two of its faces perpendicular to each other against the two walls of the channel 1, Fig. 25, of the slide $v'$, comprising the angle 2, Fig. 25, and consequently becomes a part of $v'$.

When the printing device is to be employed in tracing musical notes and signs, the finger-piece $r''$ of the type-bar, Figs. 22 and 23, is lowered, and as a necessary consequence the slide $v'$, until the type which is to be found in the roller $p''$ ready to give the impression is inked by coming in contact with the inking-roller S. In this operation of lowering the springs $b''$ are pressed and suffice to reconduct the slide $v'$ and the finger-piece $r''$ into their original position the moment the pressure on the finger-piece eases. The roller $p''$ exerts an eccentric pressure on the inking-roller S, which constrains the latter to rotate and present continually-renewed portions of its inked surface to the roller. Finally the entire system formed by the stem $u'$ and the slide $v'$ is made to rotate around the pivots $s'$ by overcoming the resistance of the spring $c''$ till it assumes a vertical position. This position once obtained, the finger-piece $r''$ and the slide $v'$ are again pressed downward, thus compressing the springs $b''$ till the type which is found in its proper position leaves an impression on the prepared paper. In this latter descending vertical movement of the slide $v'$ along the stem $u'$ the roller $a''$, united to the slide $v'$, travels over the surface $a^4$, situated near $m''$, Fig. 23, (shown also in section in Fig. 24,) which is first inclined and then vertical. When the pressure acting on $r''$ is withdrawn, the whole returns to its original position under the action of the springs $c''$ and $b''$. The contact of the type of the roller $p''$ with the prepared paper takes place at the point marked by the point of the indicator $f''$ when the printing device is not in use—that is, when $f''$ occupies the position indicated by Fig. 22. When the apparatus is in action and the stem $u'$ rotates around $s'$ for the purpose of being converged to the vertical position, the roller $g''$ causes the indicator to turn around its axle in such a way that its lower point is displaced toward the left, Fig. 22. It is in consequence of this rotation of the stem $u'$ that the center of the musical sign or note or the exterior side of the letter or character to be printed is made to coincide exactly with the original position of the point of the indicator when the verticality of $u''$ has been obtained.

For the tracing of lines the ruling-pen (shown in plan, Fig. 21, in lateral elevation, Fig. 19, and in front elevation, Fig. 20) is also employed. It is fixed on the sliding block L, Figs. 16 and 17, by means of the slit plate $F'$, Figs. 19, 20, and 21, from which rises a frame $G'$, traversed through its center by an elastic socket $H'$. In this socket slides the bar $L'$, fastened to the socket $H'$ by means of a screw thumb-piece $x'''$, fixed on $L'$. This thumb-piece enters one or the other of two vertical slots 15, which are made in the walls of the above-mentioned socket. The bar $L'$ has at its lower extremity a bearing $u'''$, on which the angle-piece $v'''$ is pivoted. It is on $v'''$ that the "drawing-pen $M'$," properly so called, is directly secured. The oscillation of the angle-piece $v'''$ is limited by a suitable clamp, such as the screw-head $z'''$.

The operations of the device are as follows: Over a holding or carrying plate, preferably of zinc about four millimeters thick and of a size equal to that of the plate F, Figs. 3 and 4, is stretched a thin layer of india-rubber by means of a mastic, and a leather board is also stretched on the caoutchouc. A sheet of paper like that used in taking autographic impressions is then prepared with a mixture of starch, glue, and gamboge and stretched on the board and pasted to it around the edges. The plate of zinc is next adjusted on plate F, Figs. 3 and 4, and the clamps $k$, Fig. 18, are fixed in a position corresponding to the size of the musical sheet. The ruling device, provided with a ruling-disk having five edges $i'''$, Fig. 37, is secured by means of the screw Q, Figs. 15 and 17, on the sliding block L. On reference to Fig. 18 it will be seen that the plate I has divisions traced parallel to the main carrier G, which are further subdivided to correspond to the width of the spaces between the musical staves. These subdivisions are differently spaced on each division of the plate I, so that each division corresponds to a separate disposition of the intervals between the staves. The carrier G is made to slide toward the side C D of the frame, Fig. 18, and the indicator $q'$, Figs. 16 and 17, is made to leave its fitting till it meets that division of the plate I, Fig. 18, on which are marked the subdivisions corresponding to the space in the musical staff which it is wished to adopt. The sliding block L is fixed on the carrier G by means of the lever $g'$, Figs. 16 and 17, and the thumb-piece $D'$ of the ruling device, Figs. 36 and 37, is turned in such a way as to bring the tracing-edges of the ruling-disk $i'''$ in contact with the paper. If the carrier G is drawn by the stud or knob $u$, Figs. 18, 9, 10, 11, 12, 13, and 14, it will be stopped by the clamp $k$, Fig. 18, when the ruling disk $i'''$, Fig. 37, will have traced the five lines of the staff along the whole of the required distance. The thumb-piece $D'$, Figs. 36 and 37, is then turned in an opposite direction to that of the former rotation, the disk $i'''$, Figs. 36 and 37, is raised from the paper, the carrier G, Fig. 18, is brought back to its original position, and the sliding block L is caused to slide along it till the indicator $q'$ coincides with a second point of reference on the division of the plate I under consideration, and so the operation of tracing the staff is continued to its completion. The ruling device is then removed from the sliding block L and replaced by the printing apparatus, as indicated in Fig. 39. In the slit $t'$, Figs. 39 and 9, found all along the side D B, Fig. 39, of the frame, the graduated scales $e'$, bearing the musical measures to be changed according to the musical piece which I wish to compose, are inserted. The indicator $f''$, Figs. 22 and 23, is regulated by means of the two thumb-pieces $i''$ and $l''$ in such a way that the point of the paper where falls the point of the indicator $f''$ when the latter is in its normal position, Fig. 22, coincides with the center of the impression left on the paper by the type-bar $o''$ when the stem $u'$ is in its vertical position and $r''$ is pushed entirely down. This coincidence is verified by separate trials made on any corner of the sheet. The two indicators $d'$, Figs. 5 and 39, and $f''$, Figs. 22, 23, and 39, as also the center of the impression left by the type-bar, being all situated on the same straight line parallel with carrier G, it is evident that I can trace on the paper all the characters, notes, and musical signs at suitable intervals, according to the division of the measures traced at $e'$. All this concerns the spacing of the notes and musical signs in the direction of the lines of the staff. As to their position in the normal direction to it, whether on these lines or in the spaces between them or outside the staff, (above or below,) the same is regulated with micrometric precision by the thumb-piece $l'$ of the sliding block L, Figs. 16, 17, and 41, when I refer to the indications on the graduated plate $o'$ of the said sliding block and of the scale $n''$, Figs. 23 and 39, annexed to the printing device. The printing of the notes is obtained by replacing in the printing device the type-bars formerly employed with a bar containing the characters required. The same thing is done as already described—that is to say, a trial is made, and care must be taken to regulate the indicator $f''$ of the printing device so that its point may coincide with the left exterior side of the character—when I wish to print from left to right. When a letter has been traced on the paper, the main carrier G is displaced by turning the washer $v'$, Figs. 39, 9, 10, 11, and 13, till the point of the indicator $f''$ coincides with the extreme limit of the right of the letter last printed. This coincidence obtained a new impression is made, the characters or types being cast in such a manner that the letters remain at equal distances from each other if I am careful to proceed in the manner described. The printing device is then replaced by the ruling-pen, Figs. 19 and 21, secured on the plate P of the sliding block L, as seen in Fig. 41. A sufficiently-fluid autographic ink is used for the drawing-pen, the opening of the points being suitably regulated. By causing the sliding block to slide along the carrier G all the lines parallel to G are first traced. As the bar L', Figs. 19 and 20, can slide in the socket H', the drawing-pen can be detached at will from the paper or brought again into contact with the latter, all that is needed being to insert $x'''$, Figs. 19 and 20, in the other slot of the socket H' when it is desired to obtain other lines directed perpendicularly to the preceding ones. Thick lines to unite the jambs or strokes of the notes are best traced by means of the ruling device furnished with a ruling-disk $j'''$, Fig. 38. The arm $S'''$ of the indicator $s'''$ $t'''$, Fig. 37, is made to coincide with the jamb of one of the notes to be connected. Contact with the paper is established by means of the thumb-piece D'. The carrier G is brought forward by means of the washer $v$ of the micrometric movement, Figs. 9, 10, 11, 12, and 13, till the point of the branch or arm $t'''$, Fig. 37, coincides with the jamb of the note at which the connecting-line should stop.

To trace two or more lines parallel to each other, the plate P of the sliding block L is displaced by means of the thumb-piece $l'$, Figs. 16 and 17. These lines can be kept perfectly equidistant by means of the graduated scale $o'$ and the indicator $m'$ of the said sliding block, Fig. 17. All sloping lines can be obtained, also, by means of the ruling device by turning the rod $h'$ and the plate F around the vertical axle of the apparatus and by rendering the position of the latter immovable by causing the handle $l$ to rotate around the axle of $h$, as has been explained at the commencement of this specification.

The adaptation of the ruling device to the tracing of sloping lines is shown in Fig. 40. Similarly the ruling-pen can be used for the tracing of lines intended to have no matter what inclination. As for those great combinations which cannot be executed by means of the dies or types, they must be traced by hand by means of the curved guide-plates shown in Fig. 21 and of a drawing-pen dipped in copying-ink. When these operations are completed, the sheet of paper is withdrawn and impressions are taken on stone or zinc for ordinary lithographic printing.

Having now particularly described and ascertained the nature of this invention and in what manner the same is to be performed, I claim—

1. An apparatus for writing music, comprising a suitable bed or frame, a freely-movable support for the material on which the music is to be written attached to said bed, and a carriage traveling on said bed and provided with means for the attachment of different instruments for writing, substantially as described.

2. An apparatus for writing music, comprising a suitable bed, a frame, a freely-movable support for the material on which the music is to be written attached to said bed, a sliding bar on said bed, and a support for the writing-instruments movable on said bar, substantially as described.

3. An apparatus for writing music, comprising a suitable bed, a frame, a grooved movable support or turn-table for the material on which the characters are to be written, and a carriage traveling on said bed and provided with means for the attachment of the different writing-instruments, substantially as described.

4. An apparatus for writing music, comprising a suitable bed or frame, a movable support for the material on said bed, said bed having grooves upon two sides thereof, a bar, as G, attached at either end to slides movable in said grooves, means for moving said bar or carriage along the grooves, and a sliding block on said bar, to which can be secured different instruments for writing, substantially as described.

5. An apparatus for writing music, comprising a suitable bed, a frame, a movable support for the material on said frame, said bed having grooves on two sides thereof, upright bars attached to said bed adjacent to the grooves, a rack carried by one of said upright bars, a bar G, attached at either end to slides movable in said grooves, and a pinion supported by one of said slides, meshing with the rack, and means for turning said pinion to move the carriage, and a sliding block attached to said bar, to which are adapted to be attached various writing-instruments, substantially as described.

6. An apparatus for writing music, comprising a suitable bed or frame, a movable support for the material on said frame, said bed having grooves upon two sides thereof, upright bars attached to said bed adjacent to the grooves, a rack carried by one of said upright bars, a bar G, attached at either end to slides movable in said grooves, and a pinion supported by one of said slides and meshing with the rack, and means for turning said pinion to move the carrier, and a sliding block on said bar movable thereon by means of a rack and pinion, the rack carried by the bar and the pinion by the block, said sliding block being adapted to the support of various writing-instruments, substantially as described.

7. An apparatus for writing music, comprising a suitable bed or frame having upright bars attached thereto provided with a graduated scale, a support for the material on which the carriers are to be inserted movable on said bed, a sliding bar, a carriage, and an indicator carried thereby to register with the marks on the scale, and a sliding block adapted to support various writing-instruments and movable on said bar, said block having, also, a scale and indicator, substantially as described.

8. An apparatus for writing music, comprising a frame, a main carrier carried thereby, a sliding block secured to said carrier, a ruling device adapted to be secured to said sliding block and consisting of a plate provided with lateral arms or branches, an oscillating frame pivoted thereto, an inking-roller on said oscillating frame, ruling-disks suitably mounted thereon, and means for forcing the inking-roller against the ruling-disks, substantially as set forth.

9. An apparatus for writing music, comprising a frame, a main carrier carried thereby, a printing device adapted to be applied to said main carrier and consisting of a frame, an inking-roller displaced axially therein, a pivoted stem or case on said frame, a type-bar sliding in said stem and provided with a type-wheel, and an adjustable indicator, all operating substantially as and for the purpose set forth.

In testimony whereof I have herewith signed my name in the presence of two subscribing witnesses.

ANGELO TESSARO.

Witnesses:
FERDINANDO MAGLIONI,
SPIRITO BERNARDI.